United States Patent Office 2,816,945
Patented Dec. 17, 1957

2,816,945

PRESERVING RUBBER WITH ALKYLATED DIHYDROXY DIARYL METHANES

David J. Beaver, Richmond Heights, Mo., and Richard O. Zerbe, Nitro, W. Va., assignors to Monsanto Chemical Company, St. Louis, Mo., a corporation of Delaware No Drawing. Original application October 26, 1951, Serial No. 253,474. Divided and this application April 23, 1954, Serial No. 425,332

8 Claims. (Cl. 260—800)

This invention relates to a new and novel family of dihydroxy diaryl methanes. More particularly it relates to dihydroxy diaryl methanes derived by condensing aldehydes with di-substituted phenols containing a halogen or poly carbon alkyl group in the 2-position and an alkyl group in either the 5- or 6-position and to their method of manufacture. Especially valuable and therefore preferred are derivatives of 2,5-dialkyl phenols.

The new compounds may be represented by the general formula

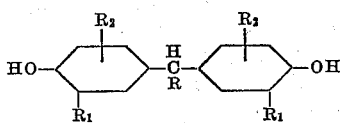

where $R_2$ is an alkyl group, R is hydrogen or an organic radical and $R_1$ is halogen or a poly carbon alkyl group of at least three carbon atoms and if less than four, R is an alkyl group of at least three carbon atoms.

With reference to derivatives of 2,5-dialkyl phenols it has been found that dihydroxy diaryl methanes of the probable general formula

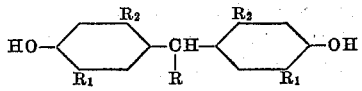

where

is a radical derived from an aldehyde reactant, as for example, formaldehyde, pyruvic aldehyde, butyraldehyde, α-ethyl- β-methyl acrolein, benzaldehyde, and the like, where $R_1$ is an alkyl group containing at least four carbon atoms and where $R_2$ is an alkyl group, preferably a short chain alkyl group, can be readily formed by condensing the appropriate 2,5-dialkyl phenol and an aldehyde and comprise a new family of highly useful antioxidants. Attempts to react these higher dialkyl phenols having the alkyl groups in positions other than the 2- and 5-positions with aldehydes and to react 2,5-dialkyl phenols having short chain alkyl groups in both positions with formaldehyde have resulted only in resins or at the most compositions which were not useful antioxidants. However, the 2,5-dialkyl phenols having an alkyl group of at least four carbon atoms in the position adjacent to the hydroxyl were found to be exceptional. From them it has been possible to produce definite chemical compounds which possess exceptional antioxidant activity. Furthermore, if higher aliphatic aldehydes are used the poly carbon chain $R_1$ may contain only three carbon atoms but the sum of the carbon atoms in the two $R_1$ groups and R should be at least nine for satisfactory reaction and properties. For example, nearly theoretical yield of a product having considerable antioxidant activity was obtained in which both $R_1$ and R contained three carbon atoms. The compounds are 4,4'-methylene bis phenols, since they do not form nitroso derivatives as do the unreacted 2,5-dialkyl phenols.

Dialkyl phenols suitable as starting materials for the preparation of the new compounds may be prepared by a variety of methods, however the position of the alkyl groups exerts a profound influence on the antioxidant properties and it is essential to employ phenols having the proper orientation of the alkyl groups. Exemplary of one suitable class of dialkyl phenols are the products prepared by alkylating a meta or 3-alkyl substituted phenol with a tertiary alcohol or olefin in the presence of sulfuric acid or phosphoric acid catalyst. This affords a convenient direct synthesis and the published evidence indicates that under these conditions the alkyl group enters the 6-position. In any event this class of products have proven to be satisfactory. Other methods of synthesis are equally well known and available for the introduction of normal alkyl groups. Examples of suitable dialkyl phenols together with their physical properties are listed below:

6-tert-butyl m-cresol, B. P. 130° C./20 mm.
2-tert-butyl 5-ethyl phenol, B. P. 135–138° C./20 mm.
6-tert-amyl m-cresol, B. P. 133–137° C./20 mm.
6-n-butyl m-cresol, B. P. 134° C./15 mm.
2-n-butyl 5-ethyl phenol, B. P. 119–121° C./4 mm.
6-iso amyl m-cresol, B. P. 104–106° C./2 mm.
6-n-hexyl m-cresol, B. P. 118–119° C./2.5 mm.
6-isohexyl m-cresol, B. P. 108–109° C./1.5 mm.
6-n-heptyl m-cresol, B. P. 126–128° C./2.5 mm.
6-n-octyl m-cresol, B. P. 141–143° C./3 mm.
6-n-decyl m-cresol, B. P. 146–147° C./2 mm.
6-n-dodecyl m-cresol, B. P. 183° C./3 mm. (m. p. 44° C.).

Still further examples of suitable 2,5-dialkyl phenols are 6-sec. butyl m-cresol, 6-(2,4-dimethyl butyl) m-cresol, 6-sec. amyl m-cresol, 6-sec. octyl m-cresol and 2,5-di-tert. butyl phenol.

Among the aldehydes which may be employed are formaldehyde, paraformaldehyde, acetaldehyde, paraldehyde, propionaldehyde, n-butyraldehyde, iso butyraldehyde, aldol, n-valeraldehyde, n-heptaldehyde, crotonaldehyde, β-ethyl-α-methyl acrolein, α-ethyl-β-propyl acrolein, pyruvic aldehyde, α-furfuraldehyde, benzaldehyde, p-hydroxy benzaldehyde, cinnamaldehyde, and the like.

Of particular importance are dihydroxy diaryl methanes of the probable general formula

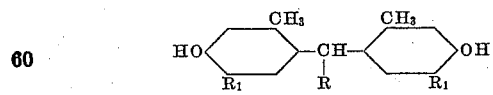

where R is an alkyl hydrocarbon group and $R_1$ is an alkyl group of at least four carbon atoms. Such compounds may be economically prepared and in general are characterized both by exceptional antioxidant properties and freedom from discoloration. They may therefore be employed in the manufacture of light colored rubber articles. Formaldehyde derivatives are efficient but less easily prepared. Derivatives of aromatic aldehydes are also antioxidants but less efficient. Similarly compounds derived from substituted aldehydes, whether aliphatic or aromatic, have in general proved to be less efficient antioxidants than those derived from the corresponding unsubstituted aldehydes. On the other hand the new compounds also comprise antiseptic and germicidal agents and for this purpose the most effective compounds have been obtained from substituted aldehydes. For example 4,4'-(p-hydroxy benzylidene)-bis-(3-methyl-6-tert-butyl phenol) exhibits excellent antiseptic properties which properties are retained in the presence of soap. This subject matter is claimed in an application filed by one of us and others January 5, 1951, Serial No. 204,698.

The condensation of the phenol and the aldehyde is usually carried out in a molar proportion of 2:1 in the presence of an acidic condensation catalyst, as for example, hydrochloric acid. Where desired solvents and/or dispersing mediums may be employed although the reactions are actually carried out in the absence of either. The following examples are illustrative of the preparation of the new compounds.

EXAMPLE 1

To a suitable container was added 98.4 grams (substantially 0.6 mole) of 6-tert-butyl m-cresol, B. P. 130° C./ 20 mm., 24.0 grams (substantially 0.33 mole) of butyraldehyde, and 6 grams of concentrated hydrochloric acid. The mixture was refluxed for about 8 hours at 100–105° C. whereupon a mushy solid developed. The latter was steam distilled free of volatile matter. Thereupon the residue was taken up with benzene and washed free of acid with water, whereupon the water-benzene mix was distilled off and the mass evaporated to dryness. The white solid so obtained was recrystallized and gave a fine white crystalline product possessing a melting point of 210.2–210.9° C. (corr.) which was believed to be 4,4'-butylidene bis-(6-tert-butyl m-cresol). Analysis for carbon and hydrogen gave 81.91% and 10.23% respectively as compared to calculated values of 81.64% and 10.01%.

EXAMPLE 2

To a suitable container was added 82.1 grams (substantially 0.5 mole) of 6-tert-butyl m-cresol as described in the foregoing example, 18.0 grams (substantially 0.25 mole) of isobutyraldehyde, and 4.7 grams of concentrated hydrochloric acid. The mixture was refluxed at 95° C. for approximately one-half hour. The reaction mixture was cooled and thereto was added 100 ml. of a liquid aliphatic hydrocarbon consisting chiefly of heptanes. The mix was agitated for 4 hours at 30–32° C. and the white solid was filtered off, washed with several portions of the aforesaid aliphatic hydrocarbon and subsequently dried. Upon recrystallization from benzene a white crystalline product was obtained which possessed a melting point of 228.9–229.7° C. (corr.) and was believed to be 4,4'-isobutylidene bis-(6-tert-butyl m-cresol). Further purification by recrystallization from heptane gave a product M. P. 229.8–230.7° C. Analysis for carbon and hydrogen gave 81.47% and 9.94% respectively as compared to calculated values of 81.64% and 10.01%.

EXAMPLE 3

To a suitable container was added 48.0 grams (substantially 0.28 mole) of 2-n-butyl-5-ethyl phenol, B. P. 119°–121° C./4 mm., 10.0 grams (substantially 0.14 mole) of n-butyraldehyde and 2.4 grams of concentrated hydrochloric acid. The mixture was refluxed for 31 hours at 115° C. Thereupon the reaction mix was steam distilled free of volatile matter. Upon removing the residual water by vacuum distillation a green-black viscous oil was obtained which was believed to be 4,4'-butylidene bis-(2-n-butyl-5-ethyl phenol).

In similar manner 4,4'-butylidene bis-(6-tt-octyl m-cresol) was prepared from n-butyraldehyde and 6-tt-octyl m-cresol (B. P. 130–140° C./5 mm.). The product was a black viscous oil.

The following crystalline compounds were prepared employing essentially the procedure of Example 2 by refluxing a half gram mole of the appropriate phenol and one-fourth gram mole of the aldehyde in the presence of hydrochloric acid catalyst. (In the preparation of compound No. 5, 0.29 gram mole of 6-tert. amyl m-cresol was refluxed with 0.15 gram mole of n-butyraldehyde in the presence of 2.4 grams of concentrated hydrochloric acid.) The reaction times varied, these being determined by spot testing at intervals with a suitable solvent or precipitant for crystal formation and quenching the reaction when crystal formation was observed and before sufficient resin was formed to interfere with the purification of the crystals. A heptane fraction as described in the detailed example was used except with compounds Nos. 7, 8 and 13. Benzene was used for Nos. 7 and 13. No. 8 was precipitated by caustic soda from glacial acetic acid.

(1) 4,4'-methylene bis-(6-tert. butyl m-cresol), M. P. 178.7–179.2° C. (corr.), white solid, from formaldehyde and 6-tert-butyl m-cresol, reaction time 2 hours. Carbon found 81.01%, calc. 81.12%. Hydrogen found 9.53%, calc. 9.47%.

(2) 4,4'-heptylidene bis-(6-tert. butyl m-cresol), M. P. 159.3–160.1° C. (corr.), pearly solid, from n-heptaldehyde and 6-tert-butyl m-cresol, reaction time 12 hours. The product recrystallized from heptane melted at 160.2–160.4° C. Carbon found 81.85%, calc. 82.03%. Hydrogen found 10.61%, calc. 10.44%.

(3) 4,4'-benzylidene bis-(6-tert. butyl m-cresol), M. P. 199.3–199.8° C. (corr.), pearly solid, from benzaldehyde and 6-tert. butyl m-cresol, reaction time ½ hour. Carbon found 83.54%, calc. 83.62%. Hydrogen found 8.55%, calc. 8.71%.

(4) 4,4'-butylidene bis-(6-n-butyl m-cresol), M. P. 121.4–122° C. (corr.), white solid, from n-butyraldehyde and 6-n-butyl m-cresol, reaction time 2 hours. Carbon found 81.96%, calc. 81.64%. Hydrogen found 10.08%, calc. 10.01%.

(5) 4,4'-butylidene bis-(6-tert. amyl m-cresol), M. P. 162.8–163.6° C. (corr.), white solid, from n-butyraldehyde and 6-tert. amyl m-cresol, (B. P. 133–137° C./20 mm.), reaction time 14 hours. Carbon found 81.60%, calc. 81.90%. Hydrogen found 10.35%, calc. 10.31%.

(6) 4,4'-(2-ethyl-2-butene-1-ylidene)-bis-(6-tert. butyl m-cresol), M. P. 185.1–186° C. (corr.), white solid, from 2-ethyl 2-butenal and 6-tert. butyl m-cresol, reaction time 18 hours.

(7) 1,1-bis-(5-tert. butyl - 4 - hydroxy-o-tolyl)-2-propanone, M. P. 196.2–197.1° C. (corr.), white solid, from pyruvic aldehyde and 6-tert. butyl m-cresol, reaction time 15 minutes. Carbon found 78.38%, calc. 78.50%. Hydrogen found 8.78%, calc. 8.96%.

(8) 4,4'-(p-hydroxy benzylidene)-bis-(6-tert. butyl m-cresol), M. P. 262.4–263.1° C. (corr.), lemon yellow solid, from p-hydroxy benzaldehyde and 6-tert. butyl m-cresol, reaction time ½ hour. Carbon found 80.33%, calc. 80.53%. Hydrogen found 8.10%, calc. 8.39%.

(9) 4,4'-ethylidene bis-(6-tert. butyl m-cresol), M. P. 201.1–201.5° C. (corr.) recrystallized from heptane, white solid, from acetaldehyde and 6-tert. butyl m-cresol, reaction time 15 minutes. Carbon found 80.93%, calc. 81.31%. Hydrogen found 9.99%, calc. 9.67%.

(10) 4,4'-propylidene bis-(6-tert. butyl m-cresol), M. P. 189.1–190.1° C. (corr.), from propionaldehyde and 6-tert. butyl m-cresol, reaction time 4 hours. After recrystallizing from heptane the product melted at 190.0–190.4° C. Carbon found 81.29%, calc. 81.48%. Hydrogen found 9.92%, calc. 9.85%.

(11) 4,4'-(2 - ethyl - 2 - hexene-1-ylidene)-bis-(6-tert. butyl m-cresol), M. P. 210.2–210.6° C. (corr.) recrystallized from heptane, white solid, from 2-ethyl-2-hexenal and 6-tert. butyl m-cresol, reaction time 3 hours. Carbon found 82.46%, calc. 82.46%. Hydrogen found 9.89%, calc. 10.16%.

(12) 4,4'-(2,2,2-trichloroethylidene)-bis-(6-tert. butyl m-cresol), white solid from heptane M. P. 218.8–219.3° C. from chloral and 6-tert. butyl m-cresol, reaction time 6 hours. Carbon found 63.28%, calc. 62.94%. Hydrogen found 7.01%, calc. 6.82%. Chlorine found 23.05%, calc. 23.23%.

(13) 4,4'-(2-chloroethylidene) - bis - (6-tert. butyl m-cresol), white solid from toluene M. P. 228.5–229.5° C. from chloroacetaldehyde and 6-tert. butyl m-cresol, reaction time 15 minutes. Carbon found 73.93%, cal. 74.09%. Hydrogen found 8.58%, calc. 8.55%. Chlorine found 8.95%, calc. 9.12%. This product was an effective cure retarder as well as preservative for rubber although the trichloro compound (12 above) had no effect on cure.

(14) 4,4'-(o-hydroxybenzylidene)-bis-(6-tert. butyl m-cresol), white solid from toluene M. P. 216.7–217° C., reaction time ½ hour. Carbon found 80.37%, calc. 80.53%. Hydrogen found 8.59%, calc. 8.39%. This product was prepared from salicyaldehyde and 6-tert. butyl m-cresol.

(15) 4,4'-(3,4-dimethoxybenzylidene)-bis-(6-tert. butyl m-cresol), white solid from heptane M. P. 231.2–231.9° C., from veratraldehyde and 6-tert. butyl m-cresol, reaction time ½ hour. Carbon found 78.17%, calc. 78.12%. Hydrogen found 8.60%, calc. 8.46%.

(16) 4,4'-thenylidene bis (6-tert. butyl m-cresol), white solid from heptane M. P. 223.3–223.7° C. from 2-thiophenaldehyde and 6-tert. butyl m-cresol, reaction time 15 minutes. Carbon found 76.68%, calc. 76.75%. Hydrogen found 8.41%, calc. 8.11%. Sulfur found 7.64%, calc. 7.57%.

(17) 4,4'-(2-methyl-2-pentene - 1 - ylidene) - bis - (6-tert. butyl m-cresol), white solid, M. P. 190.1–190.5% recrystallized from heptane, from 2-methyl 2-pentenal and 6-tert. butyl m-cresol, reaction time 18 hours. Carbon found 82.15%, calc. 82.30%. Hydrogen found 9.52%, calc. 9.87%.

(18) 4,4'-butylidene bis (6-isopropyl m-cresol), M. P. 165.1–165.8° C. (corr.), white solid, from n-butyraldehyde and 6-isopropyl m-cresol, reaction time 3 hours. Carbon found 81.57%, calc. 81.31%. Hydrogen found 9.79%, calc. 9.67%.

As illustrative of the antioxidant properties of the new dihydroxy diaryl methanes several rubber base stocks were compounded comprising:

| | Parts by weight |
|---|---|
| Pale crepe rubber | 100.0 |
| Zinc oxide | 60.0 |
| Lithopone | 20.0 |
| Sulfur | 2.0 |
| Diphenyl guanidine phthalate | 0.825 |
| Benzothiazyl thio benzoate | 0.675 |
| Paraffin | 0.25 |

To each base stock was added 1.0 part by weight of one of the antioxidants listed below. The respective stocks were cured in the usual manner by heating in a press at 126° C. for 45 and 60 minutes. The first column of data in the following table shows the percent retention of ultimate tensile strength obtained after aging for 12 hours in an air bomb at 121° C. at 80 lbs./in.² The figures are the averages for the two cures. The second column shows the resistance to discoloration. Samples of the cured stocks were exposed under an S–1 sunlamp for 10 days. After exposure the light reflected from the surface of the stocks was measured by means of a Photovolt Reflectance Meter calibrated against reflectance of standard MgO as 100%. The data shown are percent reflectance of the 60 minute cures.

Table I

| Antioxidant | Tensile retained, percent | Light reflectance, percent |
|---|---|---|
| None | [1]35 | [1]73 |
| 4,4'-methylene bis (6-tert. butyl m-cresol) | 60 | 73 |
| 4,4'-ethylidene bis (6-tert. butyl m-cresol) | 64 | 73 |
| 4,4'-propylidene bis (6-tert. butyl m-cresol) | 60 | 72 |
| 4,4'-butylidene bis (6-tert. butyl m-cresol) | 67 | 72 |
| 4,4'-heptylidene bis (6-tert. butyl m-cresol) | 68 | 75 |
| 4,4'-benzylidene bis (6-tert. butyl m-cresol) | 68 | 60 |
| 4,4'-butylidene bis (6-n-butyl m-cresol) | 65 | 74 |
| 4,4'-butylidene bis (6-n-butyl-5-ethyl phenol) | 59 | 75 |
| 4,4'-isobutylidene bis(6-tert. butyl m-cresol) | 59 | 71 |
| 4,4'-butylidene bis (6-tert. amyl m-cresol) | 62 | 69 |
| 4,4'-(2-ethyl-2-hexene-1-ylidene)-bis-(6-tert. butyl m-cresol) | 69 | 74 |
| 4,4'-butylidene bis (6-tt-octyl m-cresol) | 60 | 75 |
| 1,1-bis (5-tert. butyl-4-hydroxy-o-tolyl)-2-propanone | 60 | 74 |
| 4,4'-(2-ethyl-2-butene-1-ylidene)-bis-(6-tert. butyl m-cresol) | 69 | 74 |
| 2,2'-butylidene bis (4,6-di-sec. amyl phenol) | 48 | |

[1] Average.

The above data illustrate the effectiveness of the new dihydroxy diaryl methanes, particularly those derived from an aliphatic aldehyde and a 6-tert. alkyl m-cresol. The importance of proper orientation of the groups is illustrated by the superiority over 2,2' butylidene bis 4,6-di-sec. amyl phenol.

As further illustrative of the antioxidant properties of the new compounds rubber stocks were aged in an oxygen bomb employing the same base stock described above. Again 1.0 part by weight of antioxidant was added and the stocks cured by heating in a press at 126° C. The compounds were then aged by heating in a bomb at 70° C. under a pressure of 300 pounds oxygen per square inch. The data below show the percent retention of ultimate tensile strength obtained after aging for 216 hours. The tensile and reflectance data are both for the 60 minute cures.

Table II

| Antioxidant | Tensile retained, percent | Light reflectance, percent |
|---|---|---|
| None | 68 | 69 |
| 4,4'-butylidene bis (6-tert. butyl m-cresol) | 86 | 72 |
| 4,4'-thenylidene bis (6-tert. butyl m-cresol) | 80 | 66 |

The new chemicals are soluble in synthetic rubber as well as natural rubber and for most preservative purposes 0.1% to 2.5% on the rubber has been found satisfactory, however, amounts outside this range may be employed where desired.

This application is a division of co-pending application Serial No. 253,474, filed October 26, 1951, which latter is a continuation-in-part of abandoned application Serial No. 159,128, filed April 29, 1950.

What is claimed is:

1. A sulfur vulcanizable rubber composition having incorporated therein a compound of the structure

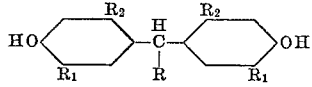

where $R_2$ is an alkyl group containing less than five carbon atoms, $R_1$ is an alkyl group containing at least four but not more than twelve carbon atoms and R is selected from a group consisting of hydrogen hydrocarbon radicals containing less than nine carbon atoms, acetyl and thienyl radicals.

2. A sulfur vulcanizable rubber composition having incorporated therein a compound of the structure

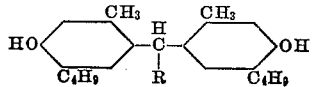

where R represents a hydrocarbon group containing less than nine carbon atoms.

3. A sulfur vulcanizable rubber composition having incorporated therein a compound of the structure

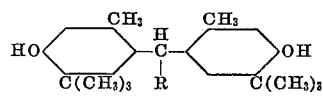

where R represents a hydrocarbon group containing at least three but less than nine carbon atoms.

4. A sulfur vulcanizable rubber composition having incorporated therein 4,4'-butylidene bis (6-tert. butyl m-cresol).

5. A sulfur vulcanizable rubber composition having incorporated therein 4,4'-heptylidene bis (6-tert. butyl m-cresol).

6. A sulfur vulcanizable rubber composition having incorporated therein 4,4'-benzylidene bis (6-tert. butyl m-cresol).

7. A sulfur vulcanizable rubber composition having incorporated therein 4,4'-(2-ethyl-2-hexene-1-ylidene)-bis-(6-tert. butyl m-cresol).

8. A sulfur vulcanizable rubber composition having incorporated therein 4,4'-(2-ethyl-2-butene-1-ylidene)-bis-(6-tert. butyl m-cresol).

References Cited in the file of this patent
UNITED STATES PATENTS

| | | |
|---|---|---|
| 1,989,788 | Calcott et al. | Feb. 5, 1935 |
| 2,538,355 | Davis | Jan. 16, 1951 |
| 2,559,932 | Briggs et al. | July 10, 1951 |

OTHER REFERENCES

Journal of The American Chemical Society, 72, 837–839, February 1950, article by H. E. Faith.